Aug. 18, 1936.  C. L. GRAHAM  2,051,522
VEHICLE COUPLING
Filed Oct. 25, 1934  3 Sheets-Sheet 1
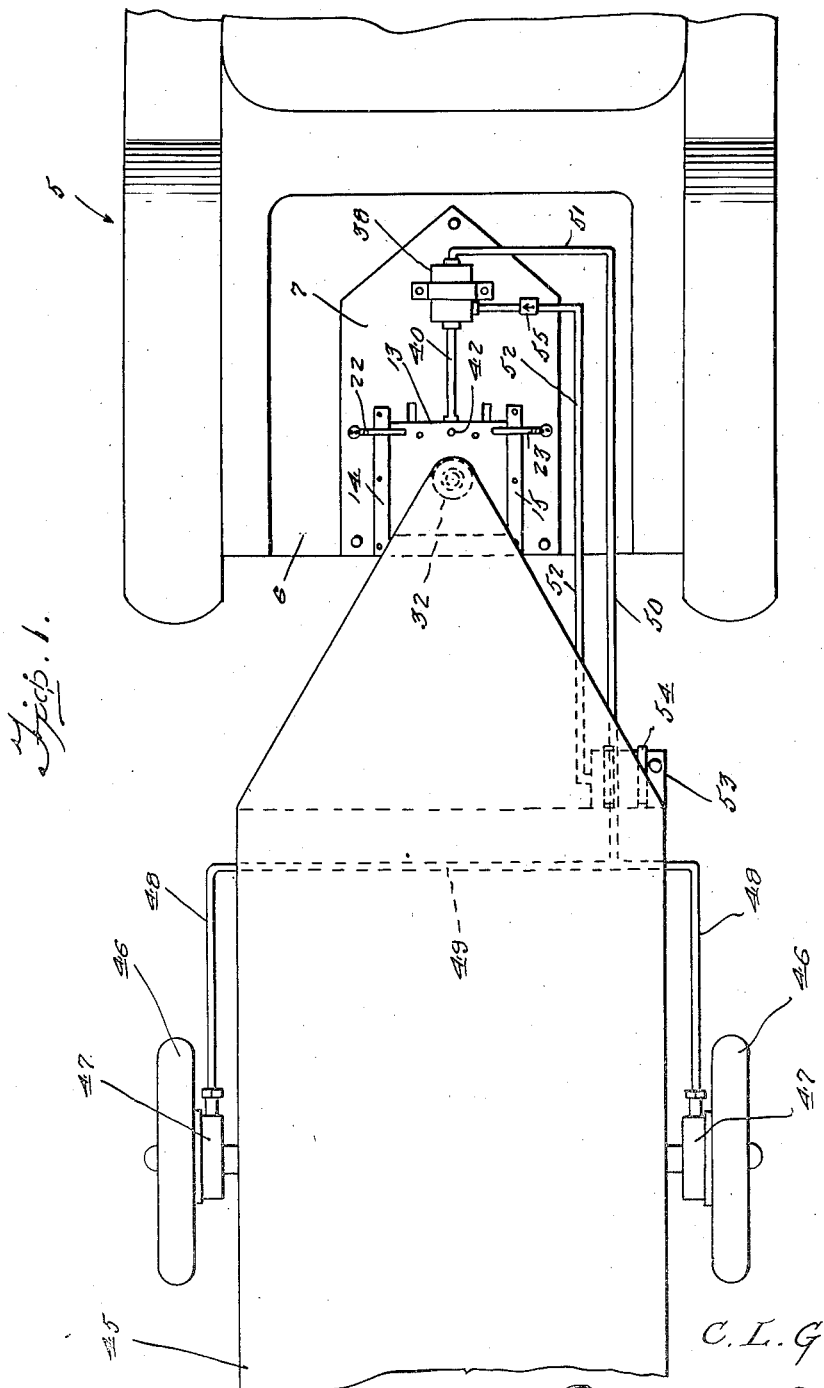
Inventor
C. L. Graham

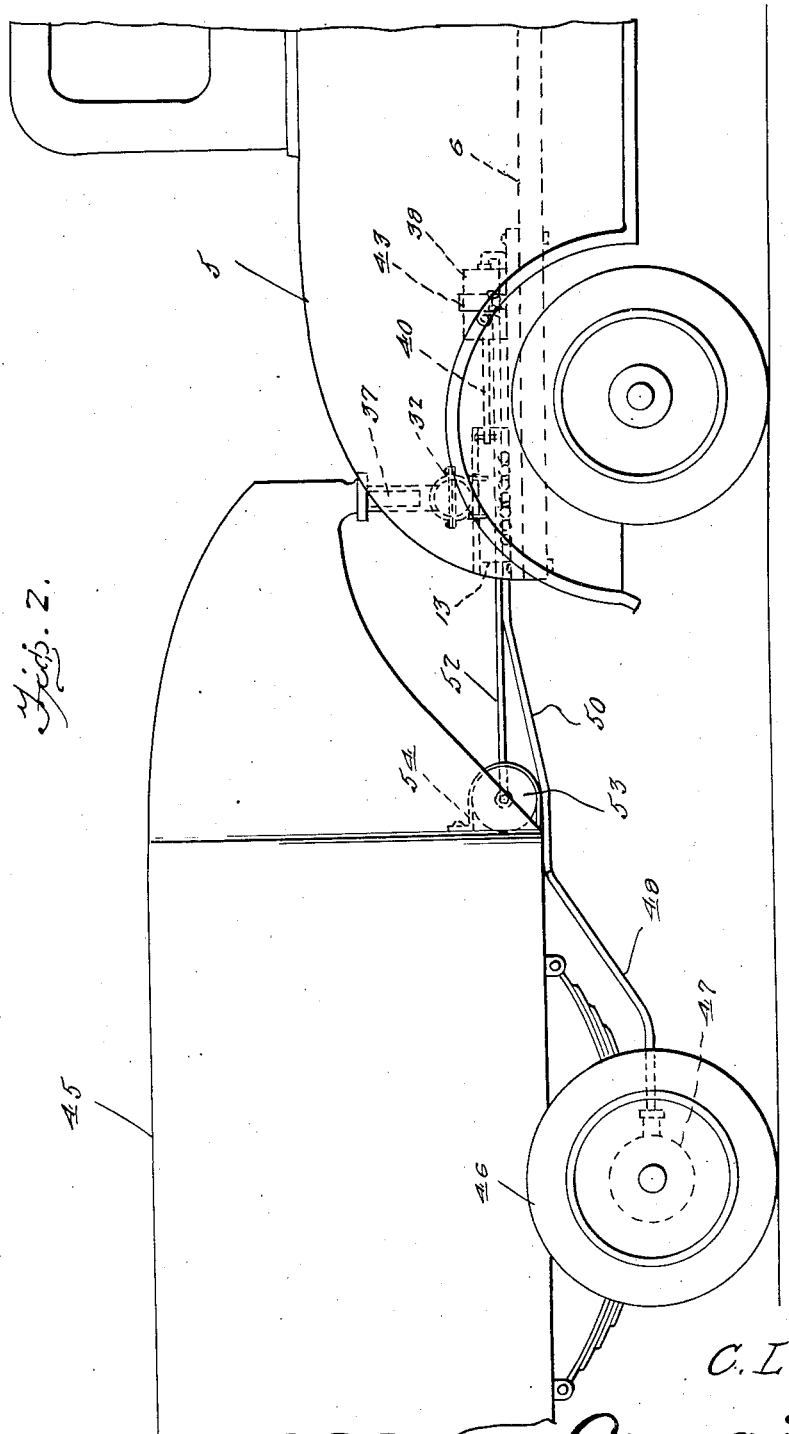

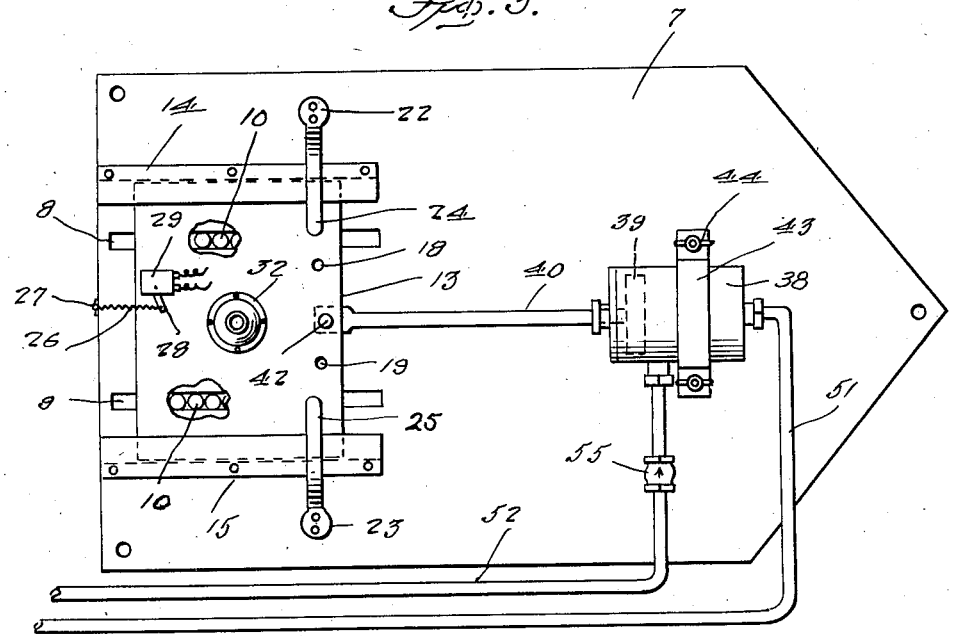

Patented Aug. 18, 1936

2,051,522

UNITED STATES PATENT OFFICE 2,051,522

VEHICLE COUPLING

Charley Laurence Graham, Miami, Fla.

Application October 25, 1934, Serial No. 750,013

2 Claims. (Cl. 188—142)

My invention relates generally to means for coupling vehicles in trains, and particularly to coupling means of this character involving means to automatically apply the brakes of the trailing vehicle or vehicles when the trailing vehicle or vehicles crowds forwardly toward the leading vehicle, so as to retard the trailing vehicle or vehicles and thereby eliminate a major portion of the forward strain and thrust which is ordinarily exerted by the trailing vehicle or vehicles when the leading vehicle is slowed down or the train is descending a hill.

It is also an important object of my invention to provide a coupling of the character indicated involving a hydraulic braking arrangement which is automatically operated by unusual forward thrust of the trailing vehicle or vehicles toward the leading vehicle.

Other objects and advantages of my invention will be apparent from a reading of the following description in connection with the drawings, wherein for purposes of illustration I have shown a preferred embodiment of my invention.

In the drawings:—

Figure 1 is a top plan view showing a rear portion of the leading or tractor vehicle and a forward portion of the trailing vehicle, showing the same coupled in accordance with the invention.

Figure 2 is a side elevational view of Figure 1.

Figure 3 is a top plan view of the portion of a coupling which is carried by the leading vehicle or tractor.

Figure 4 is a longitudinal vertical sectional view through Figure 3.

Figure 5 is a transverse vertical sectional view through the left hand portion of Figure 4.

While for illustrative purposes the invention is shown herein as applied to a coupé type of automobile in conjunction with a truck trailer, it will be understood that the invention is equally applicable to the coupling of cars and locomotives of railway trains, the tractor and trailing machinery of powered farm implements, and to other similar uses.

Referring in detail to the drawings, the numeral 5 refers generally to a coupé type of automobile having at the rear thereof the platform 6 on which rests the metallic base 7 having in the upper surface thereof a pair of longitudinal parallel ball bearing holding grooves 8, 9, respectively, in each of which is arranged a longitudinal series of ball bearings 10 which are received in similarly disposed grooves 11, 12, respectively, in the underside of a heavy metallic rectangular slide 13 which is confined slidably in place on the ball bearings and on the base 7 by L-shaped retainers 14, 15, respectively, each of which is composed of the vertical wall 16, and the inwardly directed flange portion 17 both connected together and held to the base 7 by means of the bolts 18. In the forward part of the plate slide 13 are holes 18, 19 which register with correspondingly spaced holes in the base 7 so as to accommodate pins which hold the slide 13 in a rearwardly retracted position so as to prevent inadvertent forward sliding of the slide 13 and unwanted application of the brakes thereby when the device of the invention is not in use.

On the base 7 at the outside of each one of the retaining members 14, 15 is attached a shock absorber 22, 23 respectively, which has its arm suitably connected to the slide 13 as indicated at 24, 25 to check the forward and/or rearward movement of the slide so as to prevent uncontrolled movement thereof.

A spring 26 anchored as indicated at 27 to the rear part of the base 7 has its forward end connected to the switch arm 28 of a stop light switch 29 which is mounted on the slide 13, so that the switch will be closed when the slide 13 moves forwardly in the brake applying direction. Suitable electrical connections (not shown) are made to the switch 29 for operating a suitable stop signal which may be mounted either on the tractor or leading vehicle or on the trailer.

At a central location on the top of the slide 13 there is bolted as indicated at 30 the lower hemispherical half 31 of the ball and socket connection which is generally designated 32. The upper hemispherical half 33 is connected to the lower half so as to confine therein the ball 34 on the lower end of the tubular shaft 35 which projects through an opening in the upper hemispherical half 32 as shown in Figure 4. The upper part of the shaft 35 is hollow as indicated at 36 forming a socket to receive the pin 37 on the front end of the trailer, thereby affording draft connection between the trailer and the automobile 5.

Mounted on the base 7 forwardly of the slide 13 and its retainers and located on approximately the longitudinal center of the base 7 is the hydraulic cylinder 38 in which works the piston 39 fixed on the forward end of the piston rod 40 which has its rear end received in a notch 41 in the front edge of the slide 13 and pivotally held therein by the removable pivot pin 42 which traverses the sides of the slot 41 and the rear end of the piston rod 40. By this arrangement forward movement of the slide 13 will cause compression of the brake fluid within the cylinder 38 and forwardly of the piston 39. As shown the cylinder 38 is held in place by a strap or band 43 which is connected to the base 7 by means of bolts having finger nuts 44, thereby enabling easily disconnecting the cylinder 38 from the base 7, upon withdrawal of the pivot pin 42, whereby the cylinder 38, the piston rod 40 and the brake fluid conduits may be removed from the automobile and stored on the trailer when the device of the invention is not in use and the trailer is disconnected from the tractor or automobile.

The trailer which is generally designated 45 may be of any suitable type having a pair of ground engaging wheels 46 including hydraulic brakes 47 from which lead brake fluid conduits 48 which connect to opposite ends of the junction conduit 49 from which leads the rubber pipe 50 which reaches forwardly and has a lateral portion 51 connected to the front end of the brake applying cylinder 38 as shown in Figures 1 and 3. The rear end or intake end of the cylinder 38 receives its fluid from the rubber pipe 52 which leads therefrom to the fluid reservoir 53 which is rotatably mounted by bands 54 on a forward part of the trailer. Because the reservoir 53 is rotatably mounted on the trailer, the storing of the cylinder 38 on the trailer is facilitated, since removal of the cylinder and the rubber pipes 51, 52 and 50 from the automobile is made thereby possible without disconnecting any of the pipes or affecting the connections thereof. A suitable check valve 55 is interposed in the pipe 52. Inasmuch as the hydraulic brakes concerned are of any conventional type as far as the present invention is concerned, no detailed illustration or description thereof is believed necessary.

It will be obvious that when the trailer 45 pushes forwardly relative to the automobile 5, as will take place when the automobile 5 is slowed down or the train is descending a hill, that the slide 13 will be correspondingly urged forwardly against the resistance of the shock absorbers 22, 23, and this movement will be transmitted to the piston rod 40 and the piston 39 within the cylinder 38 so as to compress the brake fluid in the forward part of this cylinder and cause the same to move under pressure through the pipe 50 to the brakes 47 on the wheels of the trailer, and thereby retard the trailer and relieve the tractor or automobile of the forward thrust from the trailer. The shock absorbers prevent the slide 13 from moving too violently and too far forwardly or rearwardly or at too great a speed. Of course, the ends of the grooves in the base and in the slide operate in conjunction with the ball bearings to limit extreme forward and extreme rearward movement of the slide.

Although I have shown and described herein a preferred embodiment of my invention, it is to be definitely understood that I do not desire to limit the application of the invention thereto, and any change or changes may be made in materials, and in structure and arrangement of parts, within the spirit of the invention and the scope of the subjoined claims.

What is claimed is:—

1. In combination with a tractor and a trailer, the trailer including brakes, longitudinally extending guideways in the rear part of the tractor, a member slidably supported in the guideways, a post, a universal joint connecting the post with the sliding member, means for connecting the post to the front end of the trailer, means for applying the brakes of the trailer by forward movement of the sliding member and means for holding the sliding member against movement and in its rearmost position when desired.

2. In combination with a tractor and a trailer, said trailer including wheels having hydraulic brakes, longitudinally extending guideways in the tractor, a member slidably arranged in said guideways, a post, a universal joint connecting the post with the sliding member, means for connecting the front end of the trailer to the post, a cylinder in the tractor containing fluid, a piston in the cylinder, a rod connecting the piston with the front end of the slide member, conduits connecting the cylinder with the brakes of the trailer, whereby forward movement of the sliding member will apply the brakes and shock absorbers for checking the forward movement of the slide member.

CHARLEY LAURENCE GRAHAM.